(No Model.)

C. E. W. WOODWARD.
RIM AND RUBBER TIRE FOR VEHICLE WHEELS.

No. 443,735. Patented Dec. 30, 1890.

Witnesses

Inventor
Charles E. W. Woodward
By Earle Seymour
Attys

THE NORRIS PETERS CO., PHOTO-LITHO., WASHINGTON, D. C.

UNITED STATES PATENT OFFICE.

CHARLES E. W. WOODWARD, OF CHICOPEE FALLS, MASSACHUSETTS, ASSIGNOR TO THE OVERMAN WHEEL COMPANY, OF SAME PLACE.

RIM AND RUBBER TIRE FOR VEHICLE-WHEELS.

SPECIFICATION forming part of Letters Patent No. 443,735, dated December 30, 1890.

Application filed July 26, 1890. Serial No. 360,008. (No model.)

*To all whom it may concern:*

Be it known that I, CHARLES E. W. WOODWARD, of Chicopee Falls, in the county of Hampden and State of Massachusetts, have invented a new Improvement in Rims and Rubber Tires for Vehicle-Wheels; and I do hereby declare the following, when taken in connection with accompanying drawings and the letters of reference marked thereon, to be a full, clear, and exact description of the same, and which said drawings constitute part of this specification, and represent, in—

Figure 1:
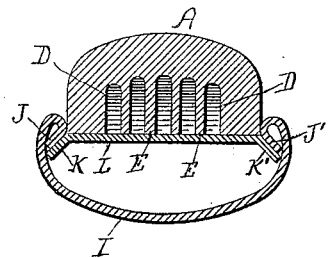
Figure 2:
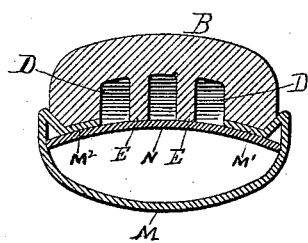
Figure 3:
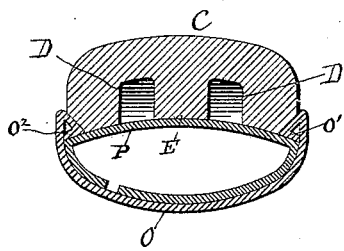
Figure 4:
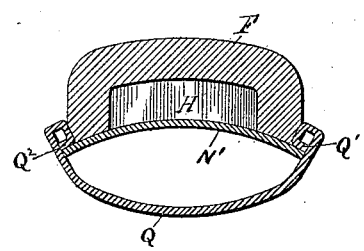
Figure 5:
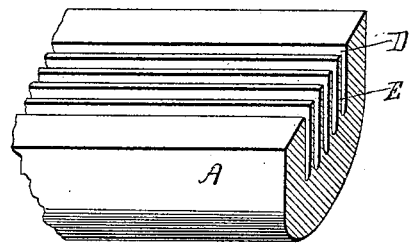
Figure 6:
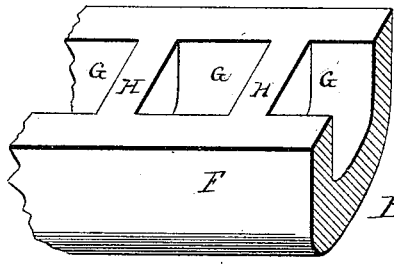

Figure 1, a view in transverse section of one form which a rim and tire embodying my invention may assume. Figs. 2, 3, and 4 are similar modified forms thereof. Fig. 5 is a reverse perspective view of a short section of the tire shown in Fig. 1, and Fig. 6 is a similar view of the tire shown by Fig. 4.

My invention relates to an improved rim and tire particularly designed for a vehicle-wheel having a broad tread, the object being to cheapen, reduce the weight, and increase the cushioning action and stability of the tire, and to simplify the construction of the rim.

With these ends in view my invention consists in a low, broad, arch-shaped tire having one or more interior supporting-ribs; in a rim composed of a shell and a bed made independently and specially constructed for being brazed together within the shell; in a rim having a crowning-bed, and in certain details of construction, as will be hereinafter described, and pointed out in the claims.

The interior supporting-ribs E of the tires A, B, and C (shown by Figs. 1, 2, 3, and 5 of the drawings) are made integral with them and arranged longitudinally, and interiorly divide them into parallel longitudinal spaces D, preferably extending to or beyond their centers. The number and width of the ribs will be dependent upon the width of the tire, upon its weight, and upon the circumstances of the use to which it is to be subjected.

The supporting-ribs H of the arch-shaped tire F, as shown by Figs. 4 and 6 of the drawings, are arranged transversely to the length of the tire, the interior space whereof they divide into transverse pockets G, also extending to or beyond the center of the tire. In this form of tire, also, the conditions above referred to will determine the number and width of the pockets and webs. All of these tires, as it will be observed, are of unusual width in proportion to their radial thickness. Their outer walls are nearly uniform in thickness.

The rims shown by Figs. 1 to 4, inclusive, of the drawings are each composed, broadly, of a shell or body portion and an independent bed brazed thereto, but vary in the form and construction of their parts. Thus the shell I (shown by Fig. 1 of the drawings) has its edges bent to form hollow loop-shaped ribs presenting flat brazing-faces J J' to the downwardly-bent edges K K' of the flat bed L, which is slipped under them, and is practically crowning in shape. The shell M of Fig. 2 of the drawings has its edges bent to form open triangular beads, having inwardly-projecting flanges forming brazing-faces $M'$ and $M^2$ for the edges of the crowning-bed N, which is slipped under them. The rim O (shown by Fig. 3) has its edges bent to form closed hollow triangular ribs, presenting slightly-inclined brazing-faces O' and $O^2$ to the bed P, which in this case consists of an open tube shaped to form a crowning-surface for the tire to rest upon. In Fig. 4 the rim Q has its edges bent to form hollow rectangular ribs, presenting slightly-inclined brazing-faces Q' and $Q^2$ to the plain crowning-bed N', which is slipped under and which is like the bed N, before mentioned. By making the bed of crowning form it is increased in strength. Each form of rim shown and described is stiffened by the beads at its edges, and each is simple in construction and very strong.

Preferably the interior spaces of the tires will extend to or beyond a plane joining the edges of the retaining-beads of the rim, so as to permit the unconfined portions of the tires to be readily displaced inwardly.

It is apparent that in carrying out my invention the rims and tires may assume still other forms. I would therefore have it understood that I do not limit myself to the exact form and construction herein shown and described, but hold myself at liberty to make such changes and alterations as shall fairly fall within the spirit and scope of my invention.

Having fully described my invention, what I claim as new, and desire to secure by Letters Patent, is—

1. A rubber tire arch-shaped in cross-section, having its sides adapted to take an endwise bearing substantially in the plane of the wheel and provided with one or more interior supporting-ribs, substantially as described.

2. A rubber tire arch-shaped in cross-section and provided with one or more longitudinal interior supporting-ribs, substantially as described.

3. A wheel-rim composed of a body or shell having its edges bent inwardly to form hollow beads and brazing-faces, and a crowning-rim slipped under the said beads and brazed to the said brazing-faces, which conform to the inclination of its edges, substantially as described.

4. A wheel-rim composed of a body or shell having its edges bent inwardly to form open triangular beads, having flanges projecting inwardly in the plane of the bed, and a bed made independently of the shell and slipped under the said flanges and brazed thereto, substantially as described.

CHARLES E. W. WOODWARD.

Witnesses:
FRANK M. PARKER,
ETHAN E. COX.